(12) United States Patent
Lai et al.

(10) Patent No.: US 12,730,272 B2
(45) Date of Patent: Sep. 8, 2026

(54) COMMUNICATION ASSEMBLY AND HEAT DISSIPATION SHIELDING MODULE THEREOF

(71) Applicant: GEMTEK TECHNOLOGY CO., LTD., Hsinchu (TW)

(72) Inventors: Yen-Yu Lai, Hsinchu (TW); Chih Yao Hsu, Hsinchu (TW)

(73) Assignee: GEMTEK TECHNOLOGY CO., LTD., Hsinchu (TW)

( * ) Notice: Subject to any disclaimer, the term of this patent is extended or adjusted under 35 U.S.C. 154(b) by 266 days.

(21) Appl. No.: 18/388,497

(22) Filed: Nov. 9, 2023

(65) Prior Publication Data

US 2025/0020879 A1 Jan. 16, 2025

Related U.S. Application Data

(60) Provisional application No. 63/526,951, filed on Jul. 14, 2023.

(51) Int. Cl.
*H04B 10/00* (2013.01)
*G02B 6/42* (2006.01)

(52) U.S. Cl.
CPC ......... *G02B 6/4269* (2013.01); *G02B 6/4277* (2013.01)

(58) Field of Classification Search
CPC .... G02B 6/428; G02B 6/4206; G02B 6/4269; G02B 6/4284; G02B 6/4281; G02B 6/42
See application file for complete search history.

(56) References Cited

U.S. PATENT DOCUMENTS 5,880,930 A * 3/1999 Wheaton ............ H05K 7/20409 361/818
6,061,235 A * 5/2000 Cromwell ............ H01L 23/552 361/698
6,198,630 B1 * 3/2001 Cromwell ............ H05K 7/1431 174/16.3
6,252,726 B1 * 6/2001 Verdiell .............. H01S 5/02208 385/94
6,477,053 B1 * 11/2002 Zeidan ............... H05K 7/20127 29/890.03
6,498,733 B2 * 12/2002 Murasawa ........... H05K 9/0037 361/818
6,577,504 B1 * 6/2003 Lofland ............... H01L 23/3672 174/16.3

(Continued)

*Primary Examiner* — Agustin Bello
(74) *Attorney, Agent, or Firm* — Maschoff Brennan

(57) ABSTRACT

A communication assembly is configured to be disposed on a substrate, and the communication assembly includes an optical fiber communication module and a heat dissipation shielding module. The optical fiber communication module is configured to be disposed on the substrate. The heat dissipation shielding module is configured for cooling the optical fiber communication module and protecting the optical fiber communication module from external electromagnetic interference, and the heat dissipation shielding module includes a shielding cover and a heat sink. The shielding cover is configured to be disposed on the substrate. The shielding cover and the substrate together surround and form an accommodation space. The optical fiber communication module is located in the accommodation space, and the shielding cover is in thermal contact with the optical fiber communication module. The heat sink and the shielding cover are made of a single piece.

14 Claims, 5 Drawing Sheets

(56) References Cited

U.S. PATENT DOCUMENTS 6,663,294 B2 * 12/2003 Crane, Jr. ........... H01S 5/02415 385/92
6,707,675 B1 * 3/2004 Barsun ................. H05K 9/0037 174/16.3
7,061,773 B2 * 6/2006 Chen .................... H05K 9/0039 361/810
7,070,340 B2 * 7/2006 Crane, Jr. ............ G02B 6/4277 385/92
9,657,930 B2 * 5/2017 Nolan ....................... F21K 9/60
10,353,163 B1 * 7/2019 Hanks .................. G02B 6/4448
10,624,240 B2 * 4/2020 Leigh .................... H01L 23/367
11,029,475 B2 * 6/2021 Patel ....................... H01L 23/42
11,089,717 B2 * 8/2021 Stathakis ........... G11B 33/1426
11,360,276 B1 * 6/2022 Blackburn ........... G02B 6/0083
11,855,371 B2 * 12/2023 He ..................... H05K 7/20418
2003/0044130 A1 * 3/2003 Crane, Jr. ............ G02B 6/4248 385/88
2010/0296250 A1 * 11/2010 Huang ............... H05K 7/20518 165/104.26
2013/0163939 A1 * 6/2013 Doric ................... G02B 6/4204 385/88
2015/0029667 A1 * 1/2015 Szczesny ............. G02B 6/4261 361/700
2016/0037642 A1 * 2/2016 Takai ................... H05K 9/0015 361/720
2016/0154193 A1 * 6/2016 Brukilacchio ......... G02B 5/003 385/33
2017/0099735 A1 * 4/2017 Takai ................... H05K 9/0058
2018/0027682 A1 * 1/2018 Adiletta ................ G06F 3/0664
2018/0259807 A1 * 9/2018 Yuuki .................... B60K 35/23
2019/0150319 A1 * 5/2019 Leigh .................... H01L 23/467 361/690
2020/0257067 A1 * 8/2020 Meunier .............. G02B 6/4284
2020/0386396 A1 * 12/2020 Wolfe .................... A01G 9/249
2021/0105915 A1 * 4/2021 Wang ................. H05K 7/20418
2021/0195801 A1 * 6/2021 Verran ............... H05K 7/20409
2021/0235597 A1 * 7/2021 Chopra ................ G02B 6/4269
2021/0278614 A1 * 9/2021 Kubo ................... G02B 6/4257
2021/0367674 A1 * 11/2021 Leclair .................... G06F 1/185
2022/0179159 A1 * 6/2022 Wu ...................... G02B 6/4271
2022/0190921 A1 * 6/2022 Chen .................... G02B 6/4269
2022/0264759 A1 * 8/2022 Sawyer ..................... G06F 1/20
2023/0050895 A1 * 2/2023 Seitz .................. H05K 7/20409
2025/0020879 A1 * 1/2025 Lai ....................... G02B 6/4277

* cited by examiner 8
5
5
1
20
10

COMMUNICATION ASSEMBLY AND HEAT DISSIPATION SHIELDING MODULE THEREOF

CROSS-REFERENCE TO RELATED APPLICATIONS

This non-provisional application claims priority under 35 U.S.C. § 119(a) to U.S. Provisional Application No. 63/526,951, filed on Jul. 14, 2023, the entire contents of which are hereby incorporated by reference.

TECHNICAL FIELD

This disclosure relates to a communication assembly and a heat dissipation shielding module thereof, more particularly to a communication assembly and a heat dissipation shielding module thereof having good heat dissipation and EMI shielding functions.

BACKGROUND

In the present day, many countries around the world have widely adopted optical fibers as the primary transmission medium in network systems. Because optical fibers use total internal reflection for transmission, they exhibit characteristics of high-speed and low transmission loss. When optical fibers are used as the transmission medium in network systems, they provide wide bandwidth, high capacity, and high-speed capabilities.

However, in optical fiber communication systems, the transmission of signals can lead to an increase in the temperature of the optical fiber communication module due to energy loss. The temperature rise is especially significant when high data transmission rates are employed in the optical fiber communication systems, causing a rapid build-up of heat in the optical fiber communication module, which affects the stability and reliability of the operation of the optical fiber communication module. In general, heat generated by the heat sources inside the optical fiber communication module is conducted and dissipated outward through the casing and heat sinks thereon. On the other hand, conventional optical fiber communication systems are often equipped with shielding enclosures to protect against electromagnetic interference (EMI). These shielding enclosures prevent signal distortion, degradation of data transmission quality, and communication failures caused by electromagnetic interference during data transmission. The shielding enclosure and the heat sink in conventional optical fiber communication systems are different components made of different materials, and the heat sink is stacked on the shielding enclosure with a thermal conductive layer in between. However, the conventional shielding enclosure has relatively poor thermal conductivity, and the thermal resistance resulted from the stacking of the heat sink, thermal conductive layer, and shielding enclosure prevents efficient heat dissipation in high-speed optical fiber communication systems and may lead to component overheating and potential damage, thereby affecting the stability and reliability of the operation of the optical fiber communication module.

SUMMARY

The present disclosure is to provide a communication assembly and a heat dissipation shielding module thereof capable of addressing the issues where high-speed optical fiber communication systems are unable to efficiently dissipate heat, resulting in component overheating and damage, and thus affecting the stability and reliability of the operation of the optical fiber communication module.

One embodiment of the present disclosure provides a communication assembly configured to be disposed on a substrate, and the communication assembly includes an optical fiber communication module and a heat dissipation shielding module. The optical fiber communication module is configured to be disposed on the substrate. The heat dissipation shielding module is configured for cooling the optical fiber communication module and protecting the optical fiber communication module from external electromagnetic interference, and the heat dissipation shielding module includes a shielding cover and a heat sink. The shielding cover is configured to be disposed on the substrate. The shielding cover and the substrate together surround and form an accommodation space. The optical fiber communication module is located in the accommodation space, and the shielding cover is in thermal contact with the optical fiber communication module. The heat sink and the shielding cover are made of a single piece.

One embodiment of the present disclosure provides a heat dissipation shielding module configured for cooling an optical fiber communication module disposed on a substrate and protecting the optical fiber communication module from external electromagnetic interference. The heat dissipation shielding module includes a shielding cover and a heat sink. The shielding cover is configured to be disposed on the substrate, and the shielding cover and the substrate together surround and form an accommodation space configured for the optical fiber communication module to be disposed therein. The shielding cover is configured to be in thermal contact with the optical fiber communication module. The heat sink is disposed on the shielding cover, and the heat sink and the shielding cover are made of a single piece.

According to the communication assembly and the heat dissipation shielding module as described above, by the heat sink integrally formed with the shielding cover, it is possible to reduce the number of components in the heat dissipation path, thereby reducing thermal resistance resulting from the stacking of components, which allows the heat generated by the optical fiber communication module to be effectively transferred directly through the integrated shielding cover and heat sink to the outside, thereby effectively dissipating the heat generated by the optical fiber communication module.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is another exploded view of the communication assembly and the substrate in FIG. 2.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
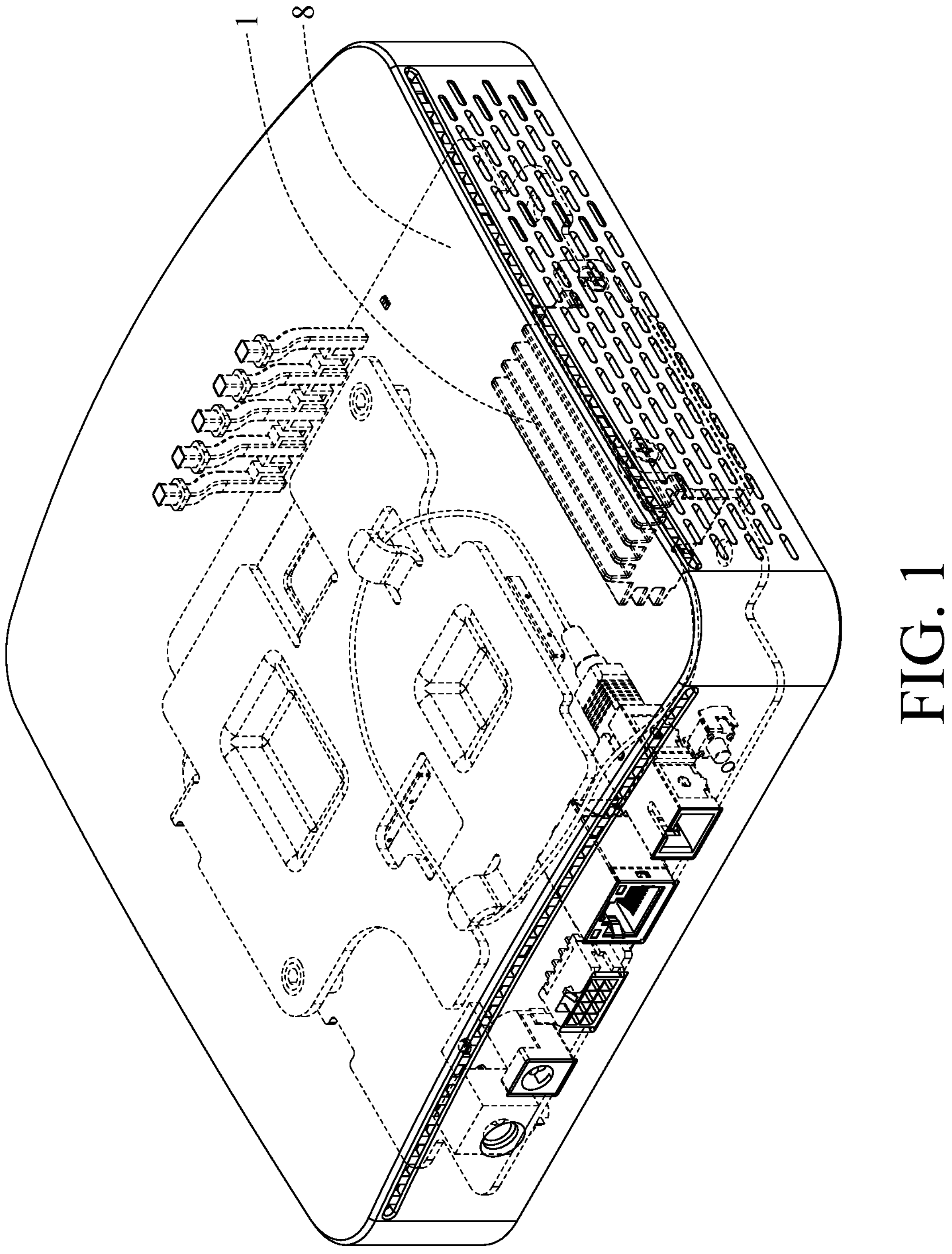
FIG. 1 is a perspective view of a communication main unit in accordance with one embodiment of the disclosure.
Figure 2:
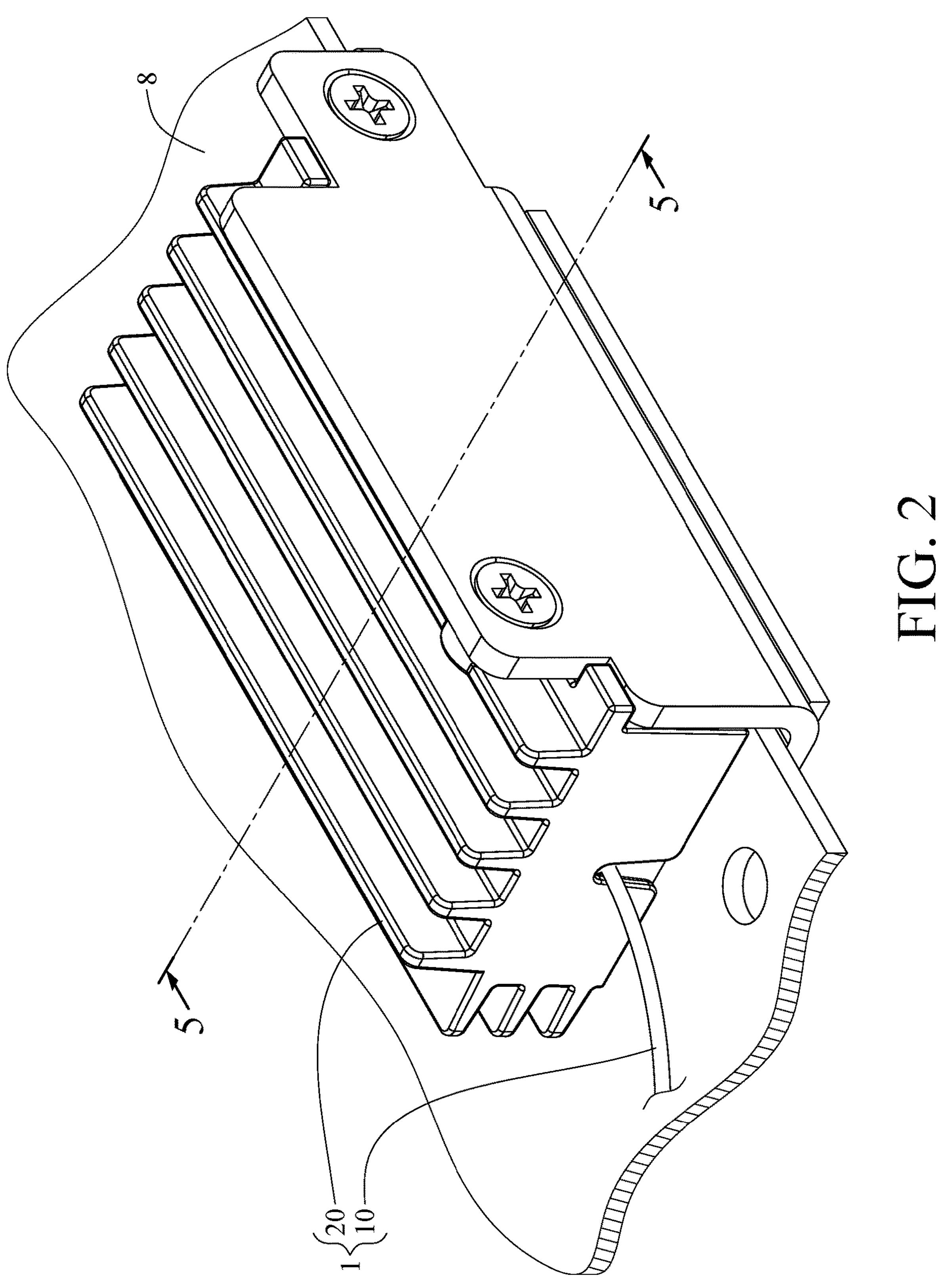
FIG. 2 is a partial view of a communication assembly and a substrate in FIG. 1.
Figure 3:
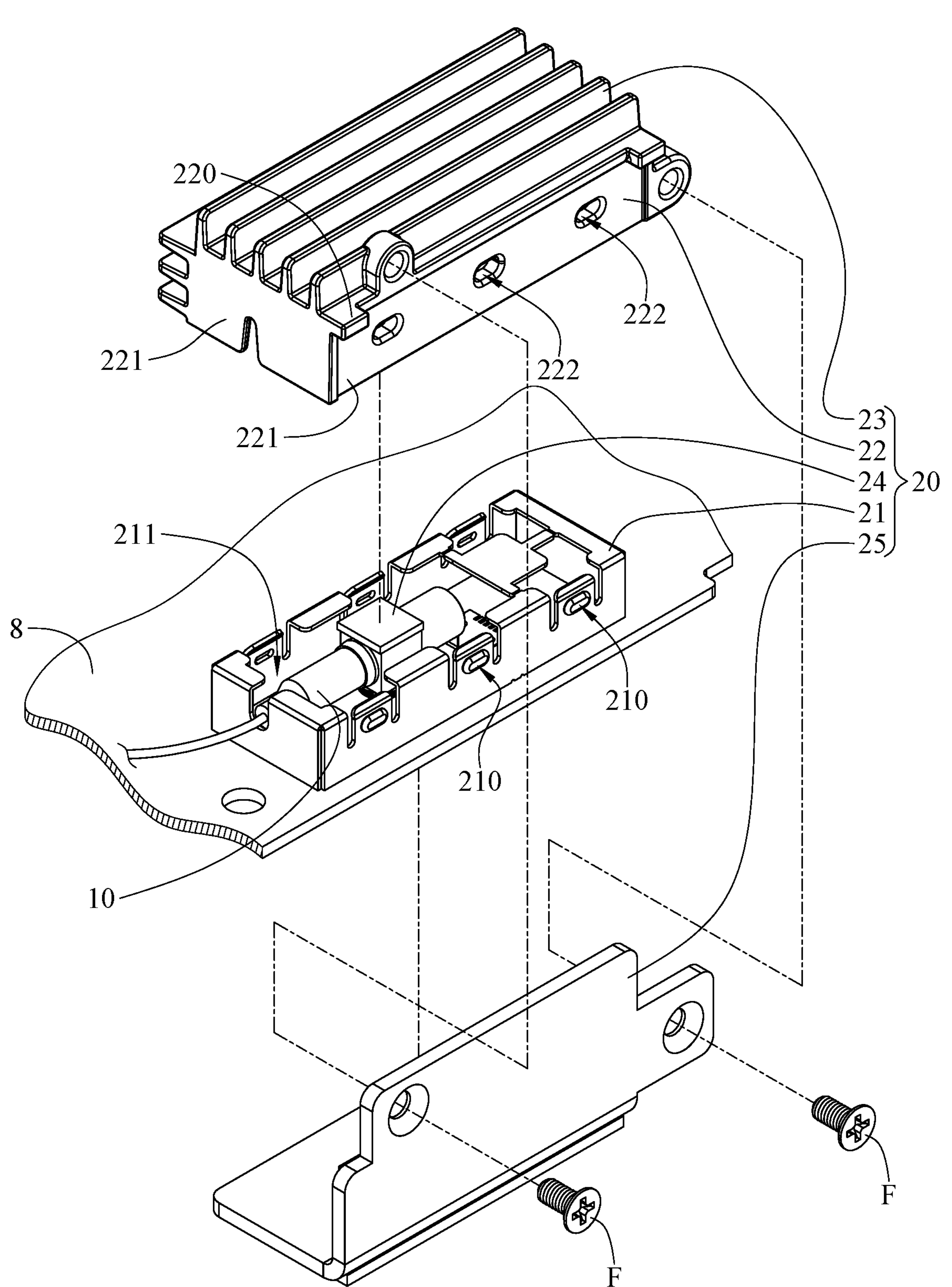
FIG. 3 is an exploded view of the communication assembly and the substrate in FIG. 2.
Figure 4:
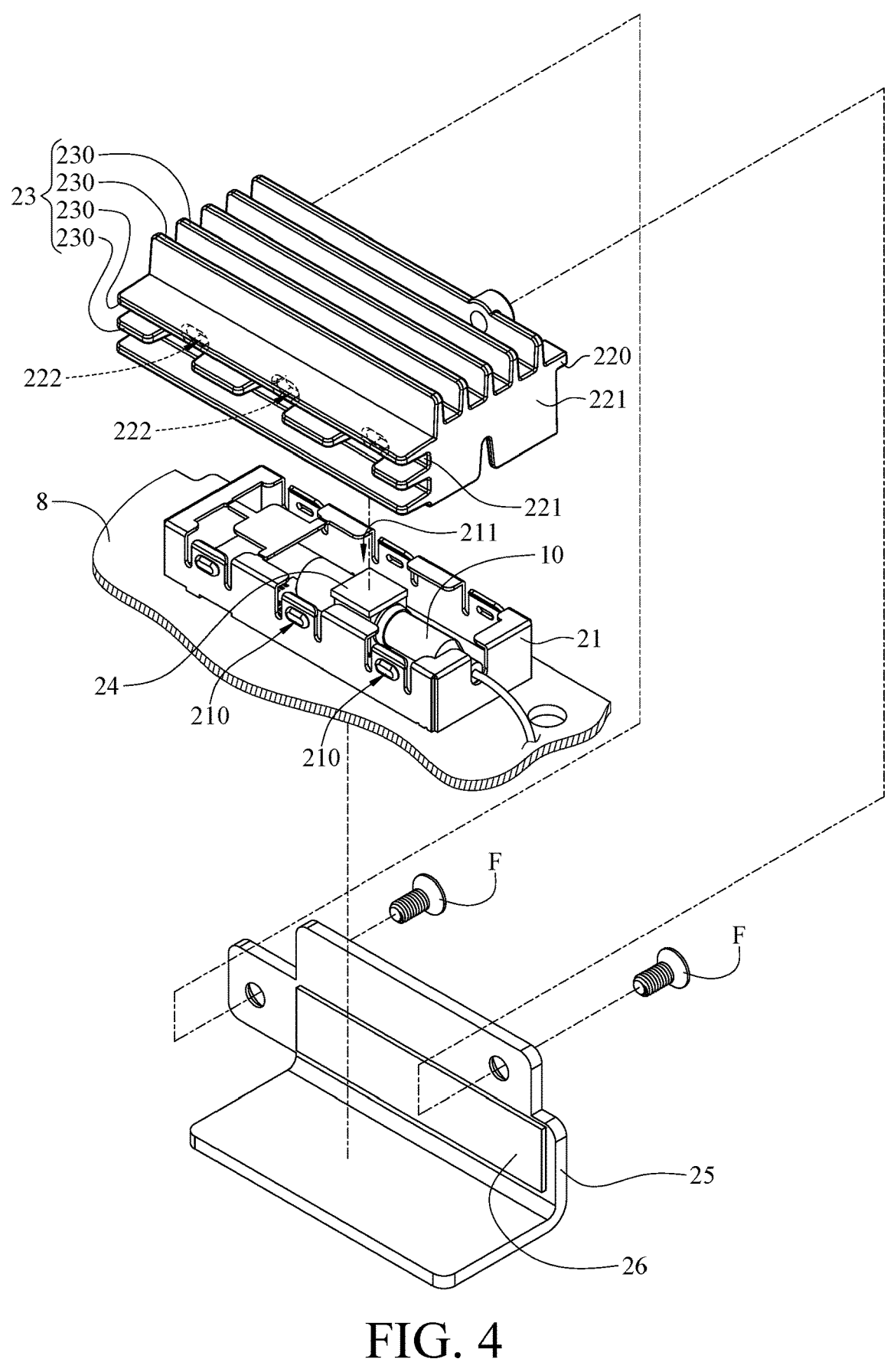
Figure 5:
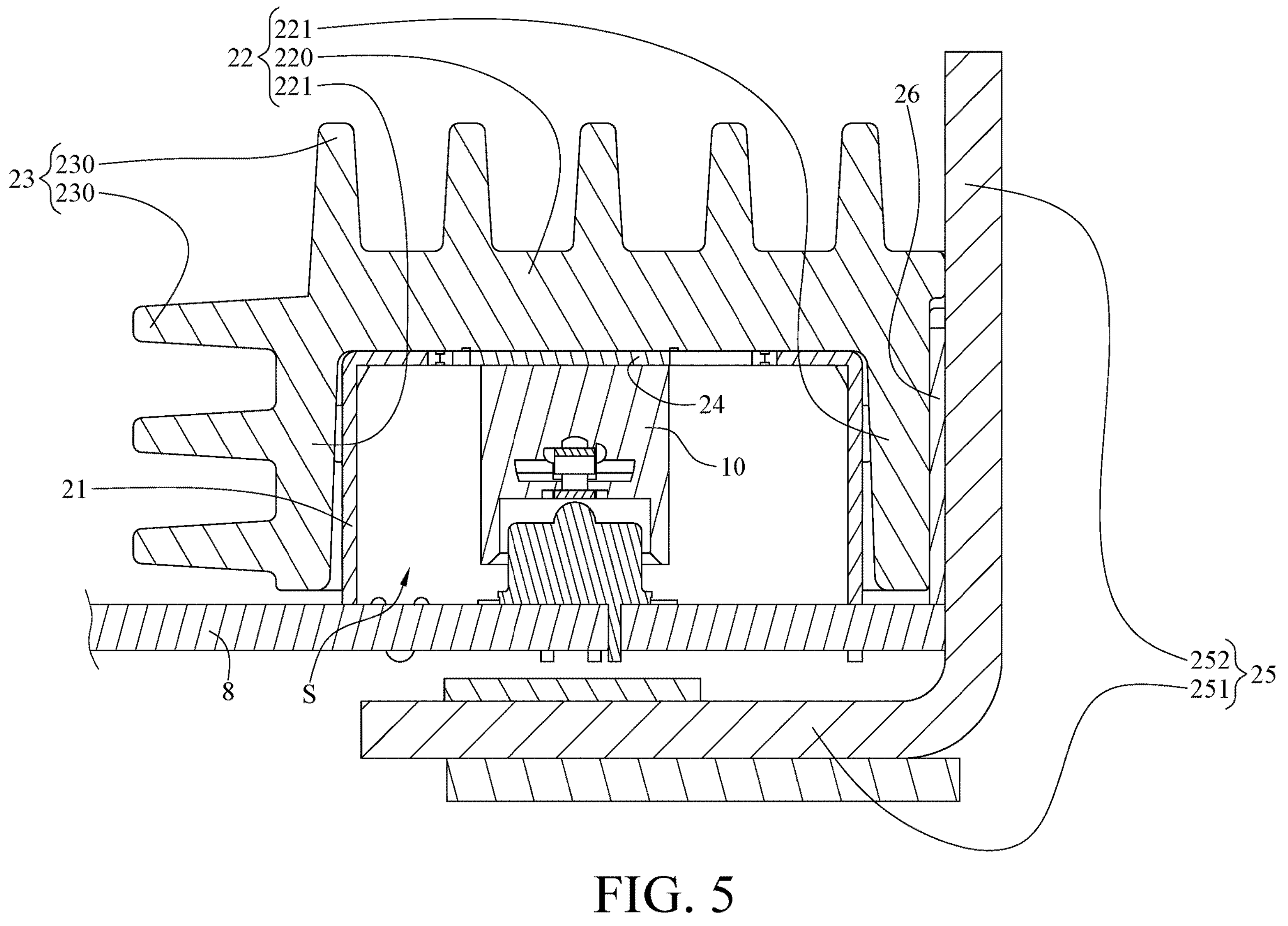
FIG. 5 is a cross-sectional view of the communication assembly and the substrate along line 5-5 in FIG. 2.

Please refer to FIG. 1 to FIG. 5. FIG. 1 is a perspective view of a communication main unit in accordance with one embodiment of the disclosure, FIG. 2 is a partial view of a communication assembly and a substrate in FIG. 1, FIG. 3 is an exploded view of the communication assembly and the substrate in FIG. 2, FIG. 4 is another exploded view of the communication assembly and the substrate in FIG. 2, and FIG. 5 is a cross-sectional view of the communication assembly and the substrate along line 5-5 in FIG. 2.

In this embodiment, a communication assembly 1 is provided. The communication assembly 1 is, for example, an optical fiber communication assembly configured to be disposed on a substrate 8 in a communication main unit 9, and the communication assembly 1 includes an optical fiber communication module 10 and a heat dissipation shielding module 20. The optical fiber communication module 10 is configured to be disposed on the substrate 8, and the heat dissipation shielding module 20 is configured for cooling the optical fiber communication module 10 and shielding the optical fiber communication module 10 from external electromagnetic interference. Furthermore, the substrate 8 is, for example, a circuit board, and the optical fiber communication module 10 is, for example, a bi-directional optical subassembly (BOSA), a transmitter optical subassembly (TOSA) or a receiver optical subassembly (ROSA).

The heat dissipation shielding module 20 includes a fixed frame 21, a shielding cover 22, a heat sink 23, a thermal conductive layer 24 and a metal heat transfer plate 25.

The fixed frame 21 is configured to be fixed to the substrate 8, and the shielding cover 22 is fixed to the fixed frame 21, such that the shielding cover 22 is indirectly disposed on the substrate 8 via the fixed frame 21. The shielding cover 22, the fixed frame 21 and the substrate 8 together surround and form an accommodation space S for the optical fiber communication module 10 to be disposed in; that is, the optical fiber communication module 10 is located in the accommodation space S surrounded and formed by the shielding cover 22, the fixed frame 21 and the substrate 8. Therefore, the shielding cover 22, the fixed frame 21 and the substrate 8 are located around the optical fiber communication module 10 to isolate the optical fiber communication module 10 from the external environment, such that the shielding cover 22 and the fixed frame 21 can shield the optical fiber communication module 10 from external electromagnetic waves, thereby preventing the optical fiber communication module 10 from electromagnetic interference.

The shielding cover 22 includes a top plate 220 and a plurality of side plates 221 that are made of a single piece. The side plates 221 surround the top plate 220 and respectively connect to edges of the top plate 220. The side plates 221 are configured to be disposed on the substrate 8 and located between the top plate 220 and the substrate 8, and the side plates 221, the top plate 220 and the substrate 8 together surround and form the accommodation space S. In addition, the shielding cover 22 has a plurality of engagement recesses 222 located at the side plates 221, and the fixed frame 21 has a plurality of engagement protrusions 210 corresponding to the engagement recesses 222. When the shielding cover 22 is assembled onto the fixed frame 21, the engagement recesses 222 of the shielding cover 22 engage with the engagement protrusions 210 of the fixed frame 21, thereby achieving a secure fit between the shielding cover 22 and the fixed frame 21. Therefore, the shielding cover 22 can be fixed onto the fixed frame 21 without the need for additional fastening means. However, it should be noted that the fixation means between the shielding cover 22 and the fixed frame 21 is not limited to the features of engagement protrusions 210 and engagement recesses 222 as introduced above. In other embodiments, the shielding cover can be secured to the fixed frame using different attachment means such as screws, or fasteners.

The heat sink 23 is disposed on the shielding cover 22, and the heat sink 23 and the shielding cover 22 are made of a single piece. In addition, a thermal conductivity of the shielding cover 22 is equal to a thermal conductivity of the heat sink 23, and the shielding cover 22 and the heat sink 23 are made of, for example, the same material, such as metal, but the present disclosure is not limited thereto. In other embodiments, the shielding cover 22 and the heat sink 23 may be made of different materials, and the thermal conductivity of the shielding cover 22 may be different from the thermal conductivity of the heat sink 23. Moreover, the fixed frame 21 and the shielding cover 22 may be made of the same material or made of different materials, and the present disclosure is not limited thereto.

The heat sink 23 has a plurality of heat dissipation fins 230, and the heat dissipation fins 230 are disposed on the shielding cover 22 and extend from the shielding cover 22 in a direction away from the optical fiber communication module 10. In this embodiment, the heat dissipation fins 230 are disposed on an outer surface of the top plate 220 and an outer surface of one of the side plates 221 of the shielding cover 22, but the present disclosure is not limited thereto. In other embodiments, the heat dissipation fins may be merely disposed on the top plate or merely disposed on one or more of the side plates. Alternatively, in other embodiments, the heat dissipation fins may be disposed on all of the side plates of the shielding cover. Moreover, the heat dissipation fins may be plate fins or pin fins, and the present disclosure is not limited thereto.

The fixed frame 21 has an opening 211 that exposes the optical fiber communication module 10, and the shielding cover 22 covers the opening 211 of the fixed frame 21 and is in thermal contact with the optical fiber communication module 10 through the opening 211.

The thermal conductive layer 24 is in thermal contact with the optical fiber communication module 10 and the shielding cover 22, and the thermal conductive layer 24 is clamped by and located between the optical fiber communication module 10 and the shielding cover 22, such that the shielding cover 22 is in thermal contact with the optical fiber communication module 10 via the thermal conductive layer 24. Moreover, the thermal conductive layer 24 may be a thermal conductive pad, a thermal paste, a heat dissipating coating or a graphite layer.

The metal heat transfer plate 25 is disposed on the shielding cover 22 and in thermal contact with the shielding cover 22 so as to further improve the heat dissipation efficiency of the heat dissipation shielding module 20. Furthermore, the metal heat transfer plate 25 includes a first portion 251 and a second portion 252 that are connected to each other, and the first portion 251 is non-parallel to the second portion 252. In this embodiment, the first portion 251 is substantially perpendicular to the second portion 252, but the present disclosure is not limited thereto. In specific, the first portion 251 and the optical fiber communication module 10 are located at two opposite sides of the substrate 8, and the second portion 252 extends in a direction from an end of the first portion 251 towards the shielding cover 22 and passes through the substrate 8. The second portion 252 is fixed to and in thermal contact with one of the side plates 221 of the shielding cover 22. Therefore, the heat conducted to the shielding cover 22 can be absorbed by the second portion 252 of the metal heat transfer plate 25, and part of the heat can be transferred by the second portion 252 to the first portion 251 located on the other side of the substrate 8 to be dissipated, such that the metal heat transfer plate 25 may increase the overall heat dissipation area of the heat dissipation shielding module 20 for further improving the heat dissipation efficiency of the heat dissipation shielding module 20. In this embodiment, the second portion 252 is fixed to the side plate 221 of the shielding cover 22 via screws F, but the present disclosure is not limited thereto. In other embodiments of the present disclosure, the metal heat transfer plate may have plate fins or pin fins for further increasing the heat dissipation area.

In this embodiment, another thermal conductive layer 26 is provided between the metal heat transfer plate 25 and the shielding cover 22, and the thermal conductive layer 26 is in thermal contact with the metal heat transfer plate 25 and the shielding cover 22 and sandwiched by the metal heat transfer plate 25 and the shielding cover 22 so as to ensure the thermal contact between the metal heat transfer plate 25 and the shielding cover 22. Moreover, the thermal conductive layer 26 may be a thermal conductive pad, a thermal paste, a heat dissipating coating or a graphite layer.

The metal heat transfer plate 25 and the thermal conductive layers 24 and 26 as introduced above are optional components, and the present disclosure is not limited thereto. In other embodiments, the heat dissipation shielding module may not include a metal heat transfer plate or a thermal conductive layer.

Compared to the conventional optical fiber communication systems where multiple components, such as the optical fiber communication module, heat sink, shielding enclosure and thermal conductive layers, are stacked in the heat dissipation path, in the communication assembly 1 of the embodiment of the present disclosure, the heat sink 23 is integrally formed with the shielding cover 22, so that the number of components in the heat dissipation path can be reduced; that is, the heat generated by the optical fiber communication module 10 can be effectively transferred to the outside directly through the thermal conductive layer 24 and the integrated shielding cover 22 and heat sink 23, thereby reducing thermal resistance resulting from the stacking of components. As such, under the same high-temperature operating conditions (e.g., 65° C. to 70° C.), the communication assembly 1 is more effective at dissipating heat compared to the conventional optical fiber communication systems. For example, in an operating environment at 65° C., using a 3-meter Ethernet cable for data and power transmission, a data transfer rate of 8.5 gigabits per second (Gbps), and a power supply of 12 volts and 0.75 amperes, the temperature of the conventional optical fiber communication system would increase to a range of 92.0 to 97.1 degrees. In contrast, the temperature of the communication assembly 1 only increases to a range of 80.8° C. to 86.4° C. Therefore, it can be observed that the communication assembly 1 effectively reduces the temperature increase by approximately 20%. Furthermore, according to the communication assembly disclosed in the present disclosure, in embodiments where the heat dissipation fins are disposed on both the top plate and one of the side plates of the shielding cover, without the presence of a metal heat transfer plate, under the aforementioned operating conditions, the temperature of the communication assembly only increases to a range of 81.8° C. to 87.4° C., which remains to be lower than the temperature increase observed in the conventional optical fiber communication systems. Additionally, in embodiments where the heat dissipation fins are only disposed on the top plate of the shielding cover and the heat dissipation shielding module does not include a metal heat transfer plate, under the same operating conditions mentioned above, the temperature of the communication assembly only increases to a range of 84° C. to 89° C., which is still lower than the temperature increase observed in the conventional optical fiber communication systems.

Furthermore, the thermal conductivity of the shielding cover 22 can be equal to the thermal conductivity of the heat sink 23, so the shielding cover 22 and the heat sink 23 can be both made of material(s) having high thermal conductivity, thereby ensuring that the heat generated by the optical fiber communication module 10 can be effectively transferred to the outside.

In view of the above description, by the heat sink integrally formed with the shielding cover, it is possible to achieve both heat dissipation and EMI shielding functions and reduce the number of components in the heat dissipation path, thereby reducing thermal resistance resulting from the stacking of components, which allows the heat generated by the optical fiber communication module to be effectively transferred to the outside directly through the integrated shielding cover and heat sink for effectively dissipating the heat generated by the optical fiber communication module.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A communication assembly configured to be disposed on a substrate, and the communication assembly comprising:
   - an optical fiber communication module configured to disposed on the substrate; and
   - a heat dissipation shielding module configured for cooling the optical fiber communication module and shielding the optical fiber communication module from external electromagnetic interference, and the heat dissipation shielding module comprising:
     - a shielding cover configured to be disposed on the substrate, the shielding cover and the substrate together surrounding and forming an accommodation space, the optical fiber communication module located in the accommodation space, and the shielding cover in thermal contact with the optical fiber communication module; and
     - a heat sink disposed on the shielding cover;
   - wherein the heat dissipation shielding module is made of a single material, and the shielding cover and the heat sink are integrated regions of the single material and are not separated by an interface formed by stacking separate components.

2. The communication assembly according to claim 1, wherein the heat sink has a plurality of heat dissipation fins, and the plurality of heat dissipation fins are disposed on the shielding cover and extend from the shielding cover in a direction away from the optical fiber communication module.

3. The communication assembly according to claim 2, wherein the shielding cover comprises a top plate and a plurality of side plates that are made of a single piece, the plurality of side plates surround the top plate and respectively connect to edges of the top plate, the plurality of side plates are configured to be disposed on the substrate and located between the top plate and the substrate, the plurality of side plates, the top plate and the substrate together surround and form the accommodation space, and the plurality of heat dissipation fins are disposed on an outer surface of the top plate and/or an outer surface of at least one of the plurality of side plates.

4. The communication assembly according to claim 3, wherein the plurality of heat dissipation fins are disposed on the outer surface of the top plate.

5. The communication assembly according to claim 3, wherein the plurality of heat dissipation fins are disposed on the outer surface of the top plate and the outer surface of at least one of the plurality of side plates.

6. The communication assembly according to claim 1, wherein the heat dissipation shielding module further comprises a thermal conductive layer, the thermal conductive layer is in thermal contact with the optical fiber communication module and the shielding cover, and the thermal conductive layer is clamped by and located between the optical fiber communication module and the shielding cover.

7. The communication assembly according to claim 6, wherein the thermal conductive layer is a thermal conductive pad, a thermal paste, a heat dissipating coating or a graphite layer.

8. The communication assembly according to claim 1, wherein the heat dissipation shielding module further comprises a fixed frame located in the shielding cover, the fixed frame surrounds the accommodation space and is configured to be fixed to the substrate, the shielding cover is fixed to the fixed frame, the fixed frame has an opening that exposes the optical fiber communication module, and the shielding cover covers the opening is in thermal contact with the optical fiber communication module through the opening.

9. The communication assembly according to claim 8, wherein the fixed frame has at least one engagement protrusion, the shielding cover has at least one engagement recess, and the at least one engagement protrusion engages with the at least one engagement recess, such that the shielding cover is fixed to the fixed frame.

10. The communication assembly according to claim 1, wherein a thermal conductivity of the shielding cover is equal to a thermal conductivity of the heat sink.

11. The communication assembly according to claim 1, wherein the heat dissipation shielding module further comprises a metal heat transfer plate, and the metal heat transfer plate is disposed on the shielding cover and in thermal contact with the shielding cover.

12. The communication assembly according to claim 11, wherein the metal heat transfer plate comprises a first portion and a second portion that are connected to each other, the first portion is non-parallel to the second portion, the first portion and the optical fiber communication module are located at two opposite sides of the substrate, the second portion extends in a direction from an end of the first portion towards the shielding cover and passes through the substrate, and the second portion is fixed to the shielding cover and in thermal contact with the shielding cover.

13. The communication assembly according to claim 1, wherein the optical fiber communication module is a bidirectional optical subassembly, a transmitter optical subassembly or a receiver optical subassembly.

14. A heat dissipation shielding module configured for cooling an optical fiber communication module disposed on a substrate and protecting the optical fiber communication module from external electromagnetic interference, and the heat dissipation shielding module comprising:

a shielding cover configured to be disposed on the substrate, the shielding cover and the substrate together surrounding and forming an accommodation space configured for the optical fiber communication module to be disposed therein, and the shielding cover configured to be in thermal contact with the optical fiber communication module; and a heat sink disposed on the shielding cover, wherein the shielding cover and the heat sink are made of a single material, and the shielding cover and the heat sink are integrated regions of the single material and are not separated by an interface formed by stacking separate components.

* * * * *